United States Patent [19]

Orzel et al.

[11] Patent Number: 5,363,646
[45] Date of Patent: Nov. 15, 1994

[54] ENGINE AIR/FUEL CONTROL SYSTEM WITH CATALYTIC CONVERTER MONITORING

[75] Inventors: Daniel V. Orzel, Westland; Glenn A. Zimlich, Dearborn Heights; Tri T. Truong, Inkster, all of Mich.

[73] Assignee: Ford Motor Company, Dearborn, Mich.

[21] Appl. No.: 126,849

[22] Filed: Sep. 27, 1993

[51] Int. Cl.$^5$ .................................. F01N 3/20
[52] U.S. Cl. ........................ 60/274; 60/276; 60/277; 60/285; 123/674; 123/703
[58] Field of Search ............ 60/272, 274, 276, 277, 60/285; 123/672, 674, 703

[56] References Cited

U.S. PATENT DOCUMENTS

| | | |
|---|---|---|
| 3,939,654 | 2/1976 | Creps . |
| 4,130,095 | 12/1978 | Bowler et al. . |
| 4,304,204 | 12/1981 | Glöckler et al. . |
| 4,526,147 | 7/1985 | Grob . |
| 4,665,705 | 5/1987 | Bonham, Jr. ............ 60/641.5 |
| 4,831,838 | 5/1989 | Nagai et al. . |
| 5,115,639 | 5/1992 | Gopp ...................... 60/274 |
| 5,207,056 | 5/1993 | Benninger ............... 60/274 |
| 5,224,345 | 7/1993 | Schnaibel et al. . |
| 5,251,437 | 10/1993 | Furuya ..................... 60/274 |
| 5,255,515 | 10/1993 | Blumenstock ........... 60/274 |
| 5,255,512 | 10/1993 | Hamburg et al. ........ 60/277 |

*Primary Examiner*—Ira S. Lazarus
*Assistant Examiner*—Daniel J. O'Connor
*Attorney, Agent, or Firm*—Allan J. Lippa; Roger L. May

[57] ABSTRACT

A control system which controls engine air/fuel ratio and provides a measurement of efficiency in the catalytic converter coupled to the engine exhaust. At the end of each of a plurality of test periods, one of three selected ratios of output signals generated from exhaust gas oxygen sensors positioned downstream and upstream of a catalytic converter are sampled and the weighted average of the selected ratio over a plurality of test periods is determined. When the weighted average exceeds a reference ratio, an indication of converter efficiency is provided. Such an indication is also provided when the selected ratio exceeds the weighted average by a preselected amount, such as three standard deviations, for a preselected number of times. The weighted average is reset to the selected ratio when the selected ratio exceeds the weighted average by a preselected amount.

18 Claims, 11 Drawing Sheets

ENGINE AIR/FUEL CONTROL SYSTEM WITH CATALYTIC CONVERTER MONITORING

FIELD OF THE INVENTION

The invention relates to controlling engine air/fuel ratio while concurrently monitoring the efficiency of a catalytic converter coupled to an engine exhaust.

BACKGROUND OF THE INVENTION

It is known to concurrently provide feedback air/fuel control and monitor of catalytic converter efficiency in response to exhaust gas oxygen sensors positioned upstream and downstream of the converter. In one known approach, converter degradation is indicated by comparing a ratio of downstream to upstream sensor switching frequency to a reference value while the vehicle is operating over a predetermined time period. In another approach, a ratio of downstream to upstream sensor amplitude is compared during the predetermined time period.

The inventors herein have recognized numerous problems with the above approaches. For example, variations in an operator's driving habits over the predetermined time period may result in variations of test results and erroneous failure indications.

SUMMARY OF THE INVENTION

An object of the invention herein is to concurrently provide engine air/fuel feedback control and monitoring of converter efficiency with less variation in monitoring results than heretofore possible.

The above object and advantages are achieved, and problems of prior approaches overcome, by providing both a system and method for controlling engine air/fuel ratio and concurrently monitoring efficiency of a catalytic converter positioned in the engine exhaust. In one particular aspect of the invention, the method comprises the steps of: controlling fuel delivery to the engine in response to an output of an exhaust gas oxygen sensor positioned upstream of the catalytic converter and an output of an exhaust gas oxygen sensor positioned downstream of the catalytic converter; providing a test period each time the engine has completed a predetermined operation; generating a monitoring ratio of a downstream signal derived from the downstream sensor output to an upstream signal derived from the upstream sensor output for each of the test periods; providing a weighted average of the monitoring ratio over a plurality of the test periods; and indicating degradation in efficiency of the converter when the weighted average of the monitoring ratio exceeds a predetermined value. Preferably, the weighted average of the monitoring ratio is reset to the monitoring ratio after the monitoring ratio exceeds the weighted average by a preselected amount. Further, the above aspect of the invention is applicable to any form of ratio comparison such as frequency ratio, amplitude ratio, or area ratio.

An advantage of the above aspect of the invention is that variations in operator habits over a test cycle should not result in an erroneous failure. An additional advantage is that use of the weighted average will not mask a significant and sudden change in converter operation because the weighted average is reset to the monitoring ratio when such a sudden change occurs.

BRIEF DESCRIPTION OF THE DRAWINGS

The object and advantages of the invention will be more clearly understood by reading an example of an embodiment in which the invention is used to advantage with reference to the attached drawings wherein.

DESCRIPTION OF AN EMBODIMENT

Figure 1:
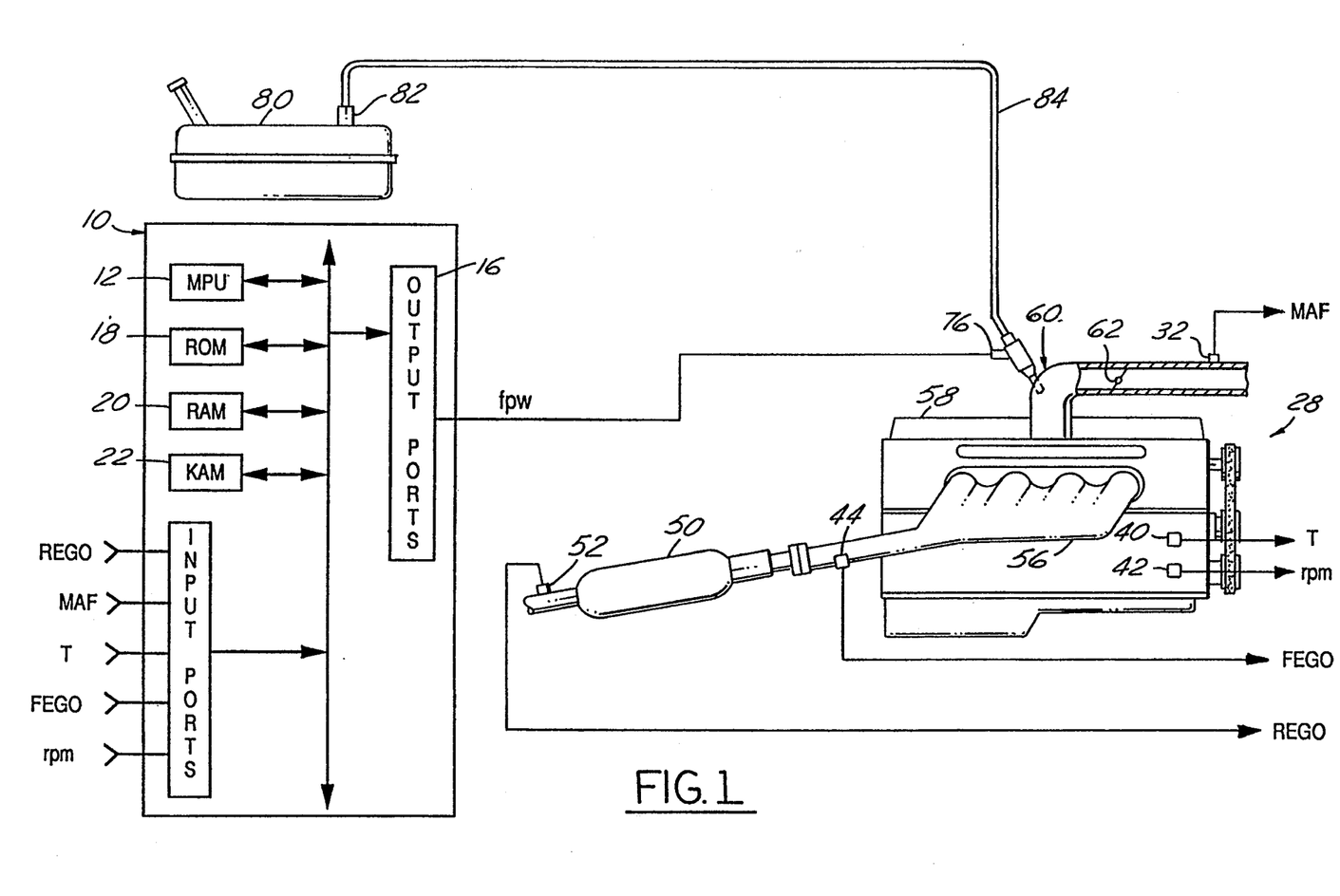
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18; random access memory 20; keep-alive memory 22; and a conventional data bus. Controller 10 is shown receiving various signals from sensors coupled to engine 28 including: measurement of inducted mass airflow (MAF) from mass airflow sensor 32; engine coolant temperature (T) from temperature sensor 40; indication of engine speed (rpm) from tachometer 42; output signal FEGO from conventional exhaust gas oxygen sensor 44, positioned upstream of catalytic converter 50; and signal REGO from another conventional exhaust gas oxygen sensor (52) positioned downstream of catalytic converter 52. Intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84. Other engine components and systems such as an ignition system are not shown because they are well known to those skilled in the art.

Although a central fuel injection system is shown, the invention claimed herein may be used to advantage with other types of systems such as sequential fuel injection or carbureted systems. Those skilled in the art will also recognize that the invention claimed herein is applicable to other engine control configurations such as "stereo" control systems wherein the fuel injectors for each bank are controlled by a separate exhaust gas oxygen sensor of the exhaust manifolds for engines having a "V" configuration.

Figures 2, 3:
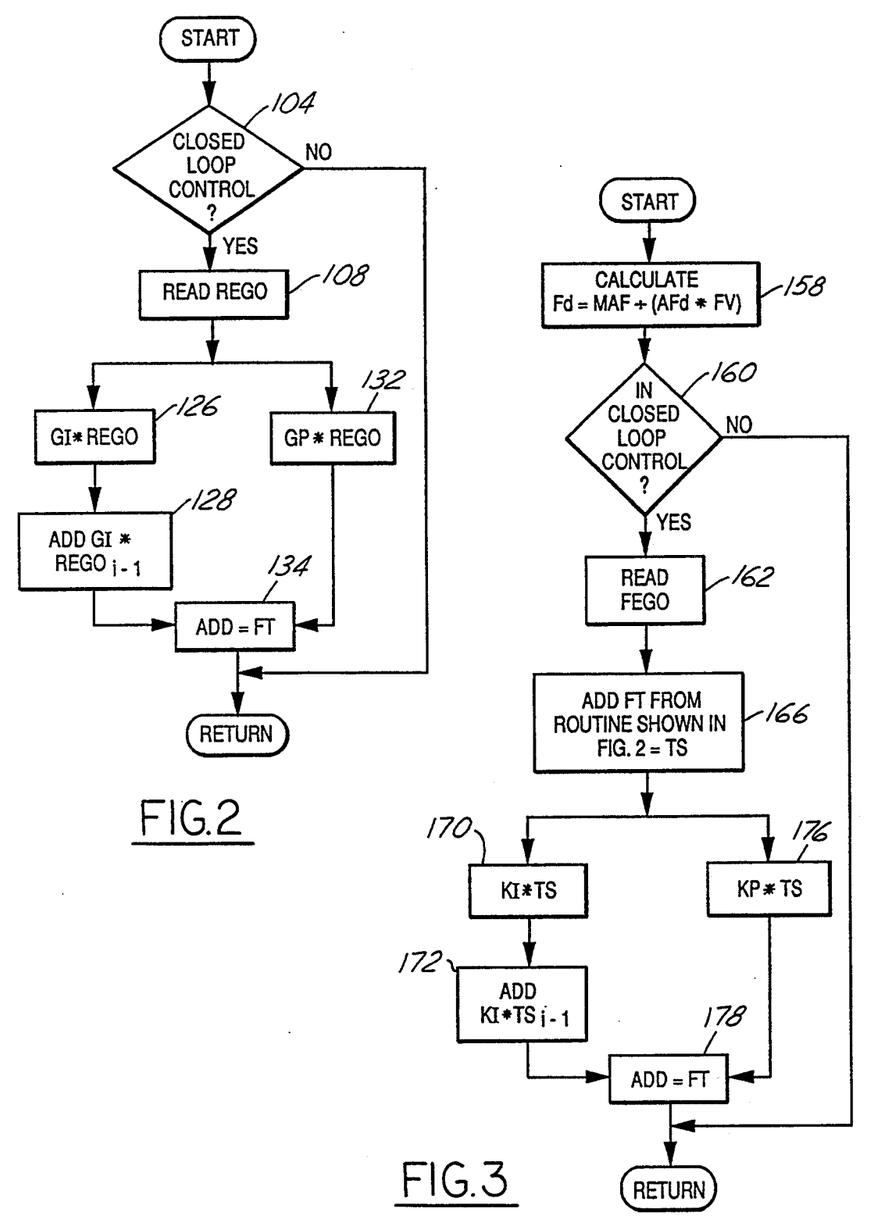
FIG. 2 is a high level flowchart of various operations performed by a portion of the embodiment shown in FIG. 1.
FIG. 3 is a high level flowchart of various operations performed by a portion of the embodiment shown in FIG. 1.

Referring now to FIG. 2, a flowchart of a routine performed by controller 10 to generate fuel trim signal FT is now described. In the particular example described herein, closed-loop air/fuel control is commenced (step 104) when engine temperature is within a predetermined range, the engine has been operating for at least a preselected time, and throttle position is within a preselected range. When closed-loop control commences, signal REGO is read (step 108) and subsequently processed in a proportional plus integral controller as described below.

Referring first to step 126, signal REGO is multiplied by gain constant GI and the resulting product added to products previously accumulated (GI * $REGO_{i-1}$) in step 128. Stated another way, signal REGO is integrated each sample period (i) in steps determined by gain constant GI. During step 132, signal REGO is also multiplied by proportional gain GP. The integral value from step 128 is added to the proportional value from step 132 during addition step 134 to generate fuel trim signal FT.

The routine executed by controller 10 to generate the desired quantity of liquid fuel delivered to engine 28 is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV which is generated as described below with respect to steps 160-178 shown in FIG. 3.

After determining that closed-loop control is desired (step 160), by monitoring engine operating conditions such as those previously described herein with reference to step 104 in FIG. 2, signal FEGO is read during step 162. Signal FEGO is then trimmed (in this example by addition) with trim signal FT which is transferred from the routine previously described with reference to FIG. 2 to generate trimmed signal TS. The product of integral gain value KI times trimmed signal TS (step 170) is generated and added to the previously accumulated products (step 172). That is, trimmed signal TS is integrated in steps determined by gain constant KI each sample period (i) during step 172. A product of proportional gain KP times trimmed signal TS (step 176) is then added to the integration of KI * TS during step 178 to generate feedback variable FV.

Alternatively, the process described above with particular reference to FIG. 3 may be performed by biasing signal FV, rather than trimming signal FEGO, with fuel trim signal FT. In one such alternative embodiment, two proportional gain constants ($KP_1$ and $KP_2$) are used to advantage. Proportional gain $KP_1$ multiplies signal FEGO when it switches from a lean to a rich indicating state and proportional gain $KP_2$ multiplies signal FEGO when it switches from a rich to a lean state. Proportional term $KP_1$ is incremented when fuel trim signal FT indicates a lean bias is desired and proportional term $KP_1$ is decreased (or $KP_2$ incremented) when a rich bias is desired by fuel trim signal FT.

Figure 4A:
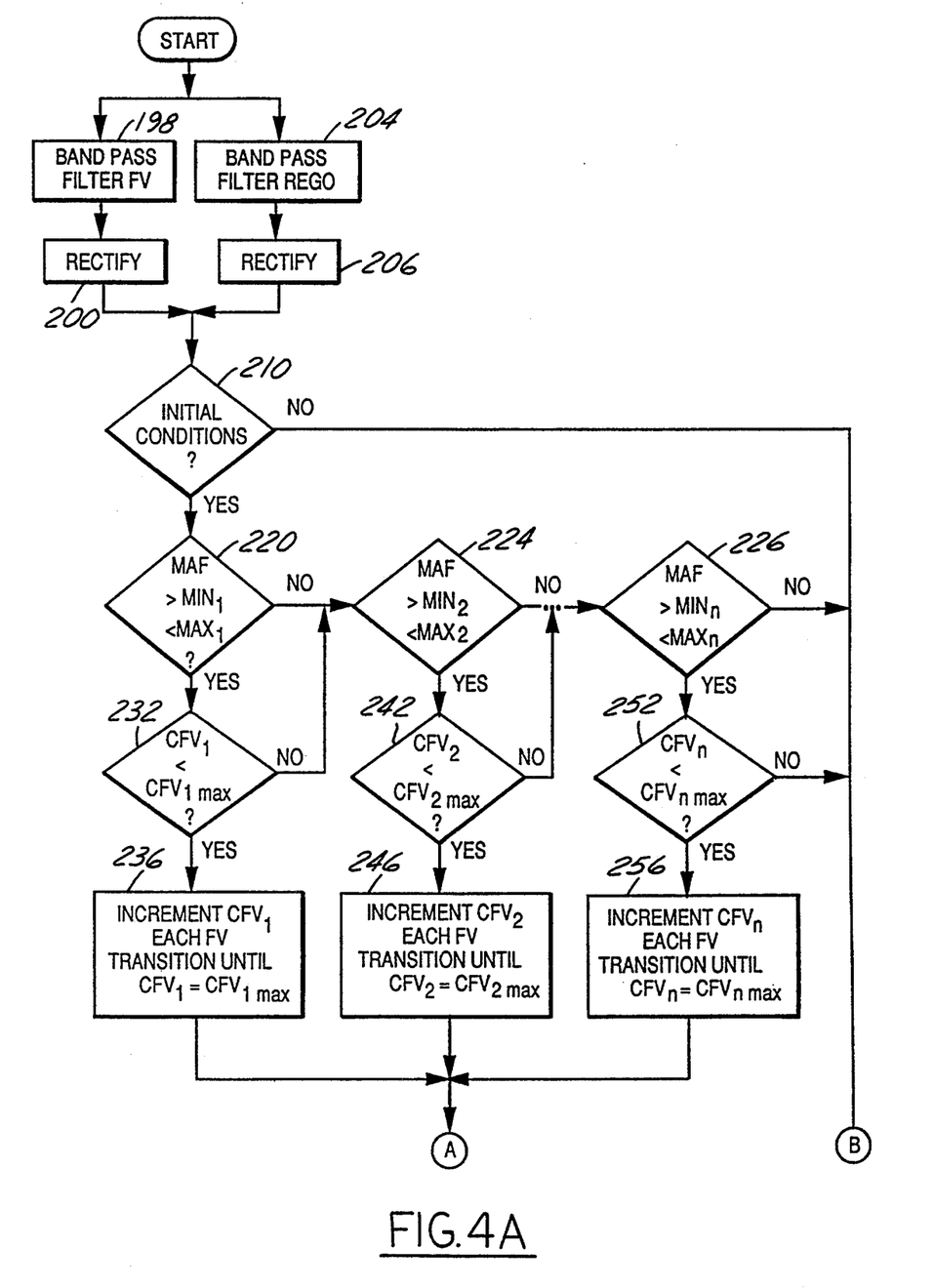
FIGS. 4A-4B are a high level flowchart of various operations performed by a portion of the embodiment shown in FIG. 1.
Figure 4B:
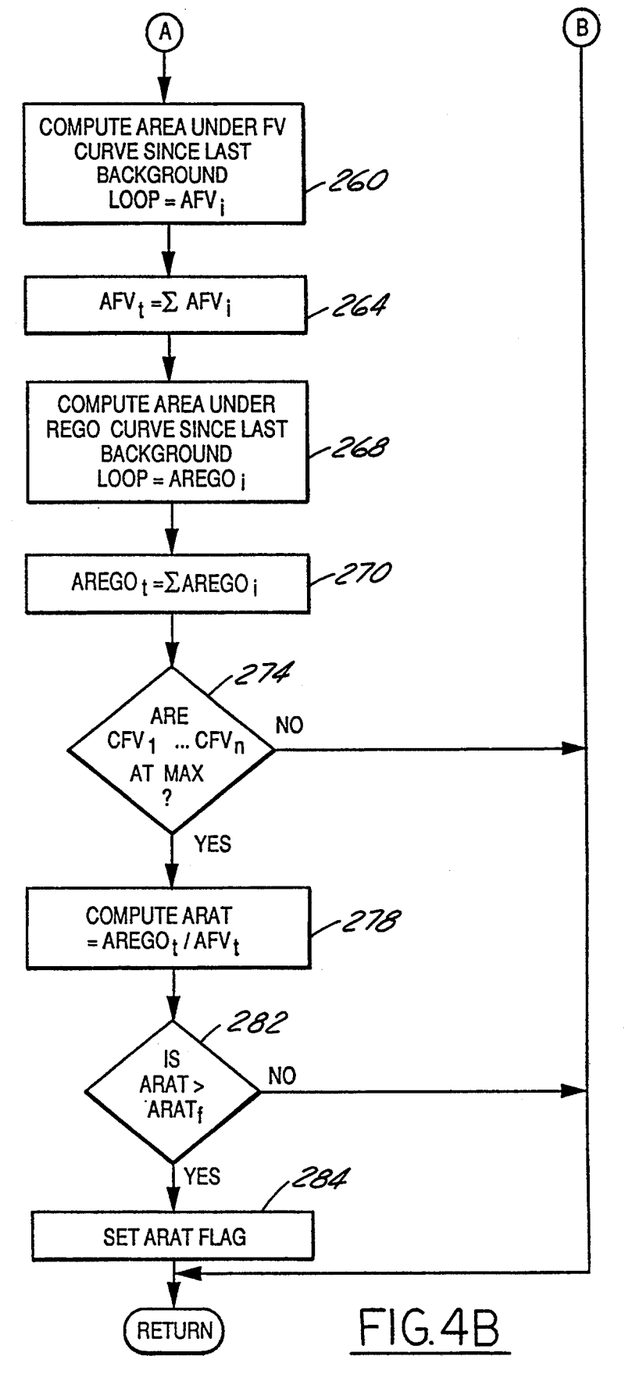

The first of three examples for providing an indication of converter efficiency is now described with particular reference to the flowchart shown in FIGS. 4A-4B. During step 198 and step 200, signal FV is band pass filtered and then rectified. A graphical representation of signal FV during typical engine operation is show in FIG. 5A and its filtered output shown in FIG. 5B (before rectification). Similarly, signal REGO is band pass filtered, and the filtered output rectified (see steps 204 and 206 in FIG. 4A). A graphical representation of signal REGO during typical engine operation is shown in FIG. 6A, and the signal output after band pass filtering is shown in FIG. 6B (before rectification). It is noted that the band pass filter operation facilitates the subsequent operation of computing area under the signal curves (i.e., integration).

Continuing with FIGS. 4A-4B, initial engine conditions are checked during step 210 before entering the test cycle described below. More specifically, the test cycle is entered when engine temperature (T) is within a predetermined range, a predetermined time elapsed since the engine was started, and the closed loop air/fuel control has been operable for a preselected time.

During steps 220, 224, and 226, the inducted air flow range in which engine 28 is operating is determined. These ranges are described as range (1), range (2) . . . , and range (n), for this example wherein "n" inducted air flow ranges are used to advantage. Assuming engine 28 is operating within air flow range (1), the transition between states of signal FV are counted to generate count signal $CFV_1$. While engine operation remains within airflow range (1), count $CFV_1$ is incremental each transition of signal FV until count $CFV_1$ is equal to maximum count $CFV_{1max}$ (steps 232 and 236).

The above described operation occurs for each airflow range. For example, when engine 28 is operating within air flow range (n), as shown in step 226, count $CFV_n$ is incremental each transition of feedback variable FV until it reaches maximum count $CFV_{nmax}$ (steps 252 and 256). As described below with particular reference to step 274, a converter test cycle or period is completed when engine 28 has operated for a predetermined period in each of "n" airflow ranges. Each of these predetermined periods is generated when feedback variable FV has completed a preselected number of transitions or cycles.

During each background loop of controller 10, the area under the curve formed by feedback variable FV (after it is band pass filtered and rectified) is computed since the last background loop. This partial area is shown as signal $AFV_i$ in step 260. Signal $AFV_i$ is added to the areas accumulated during previous background loops to generate total area $AFV_t$ (step 264).

Proceeding in a similar manner to that described above with respect to the generation of total area $AFV_t$, the area under the curve formed by signal REGO (after it is band pass filtered and rectified) is computed during steps 268 and 270. More specifically, during each background loop of controller 10, the area under the REGO curve is computed during the present background loop (step 268) and added to the previously accumulated areas to generate total area $AREGO_t$ (step 270).

Those skilled in the art will recognize that the above described operations of computing area under a curve defined by either signal FV or signal REGO, may be performed by integrating respective signal FV or signal REGO. Each area computation of signal $AFV_i$ or signal $AREGO_i$ is similar to an integration step during each background loop.

During step 274, a determination is made that the test cycle or period has been completed when the count in transitions of feedback variable FV for each airflow range ($CFV_1 \ldots CFV_n$) has reached its respective maximum value (MAX). After the test cycle has been completed, area ratio ARAT is computed by dividing the total area under the feedback variable curve ($AFV_t$) into the area under the REGO curve ($AREGO_t$) during step 278. Variables $CFV_1 \ldots CFV_n$, $AFV_t$, and $AREGO_t$ are also reset (step 280). When computed area ratio ARAT is greater than reference or predetermined area ratio $ARAT_f$, as shown in step 282, area ratio flag ARAT is set (step 284).

Figure 5A:
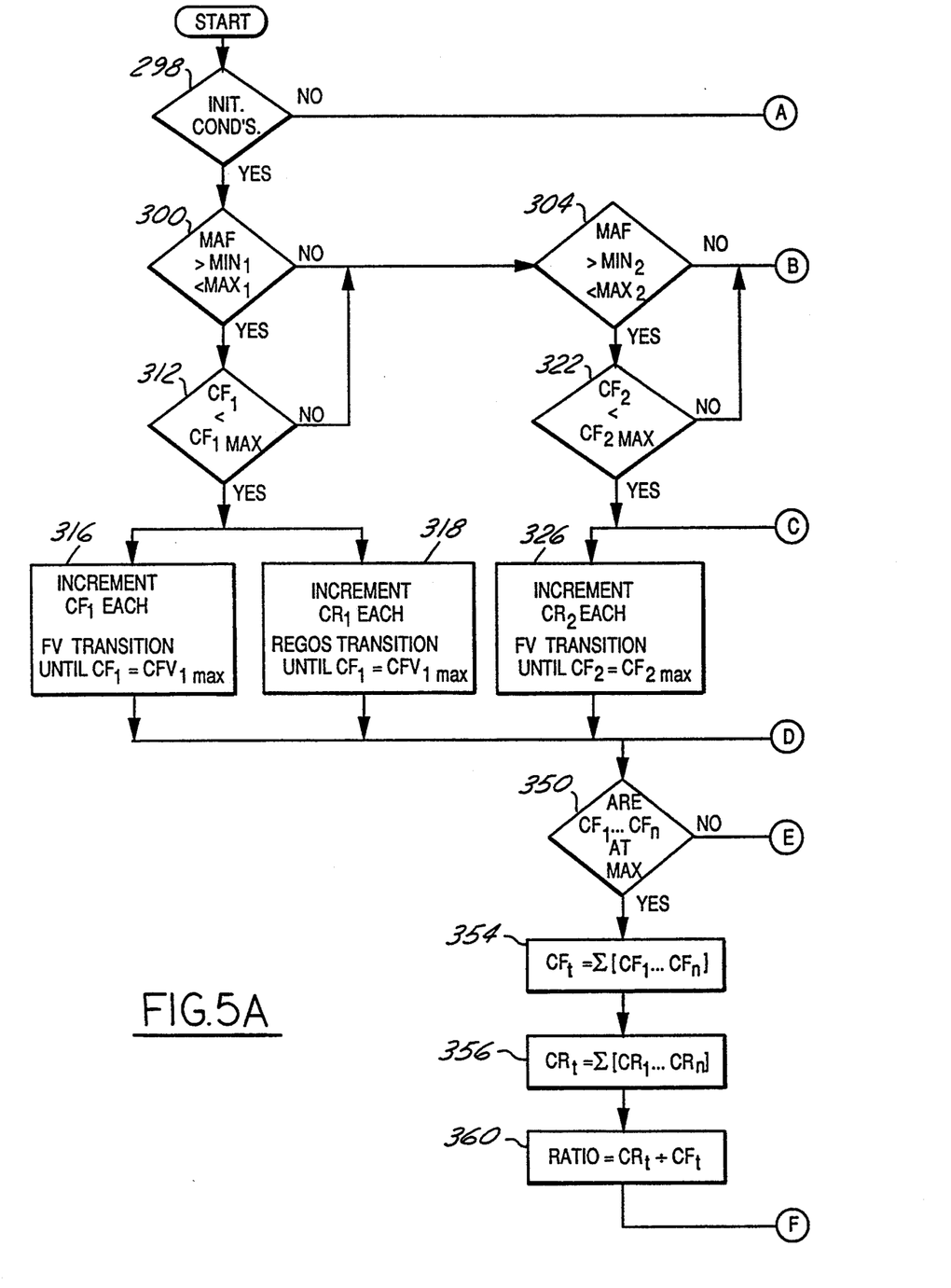
FIGS. 5A-5B are a high level flowchart of various operations performed by a portion of the embodiment shown in FIG. 1.
Figure 5B:
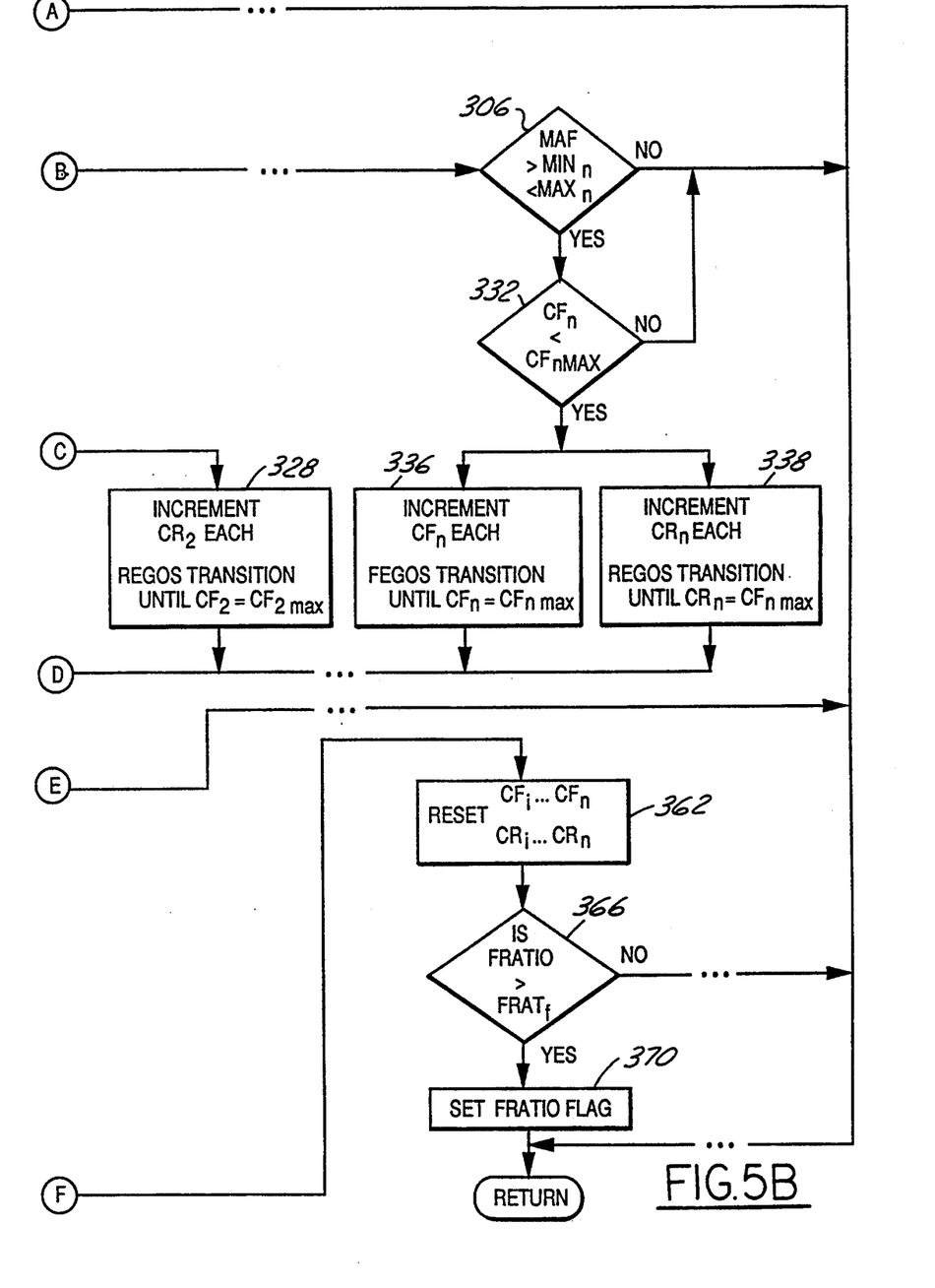
Figure 6A:
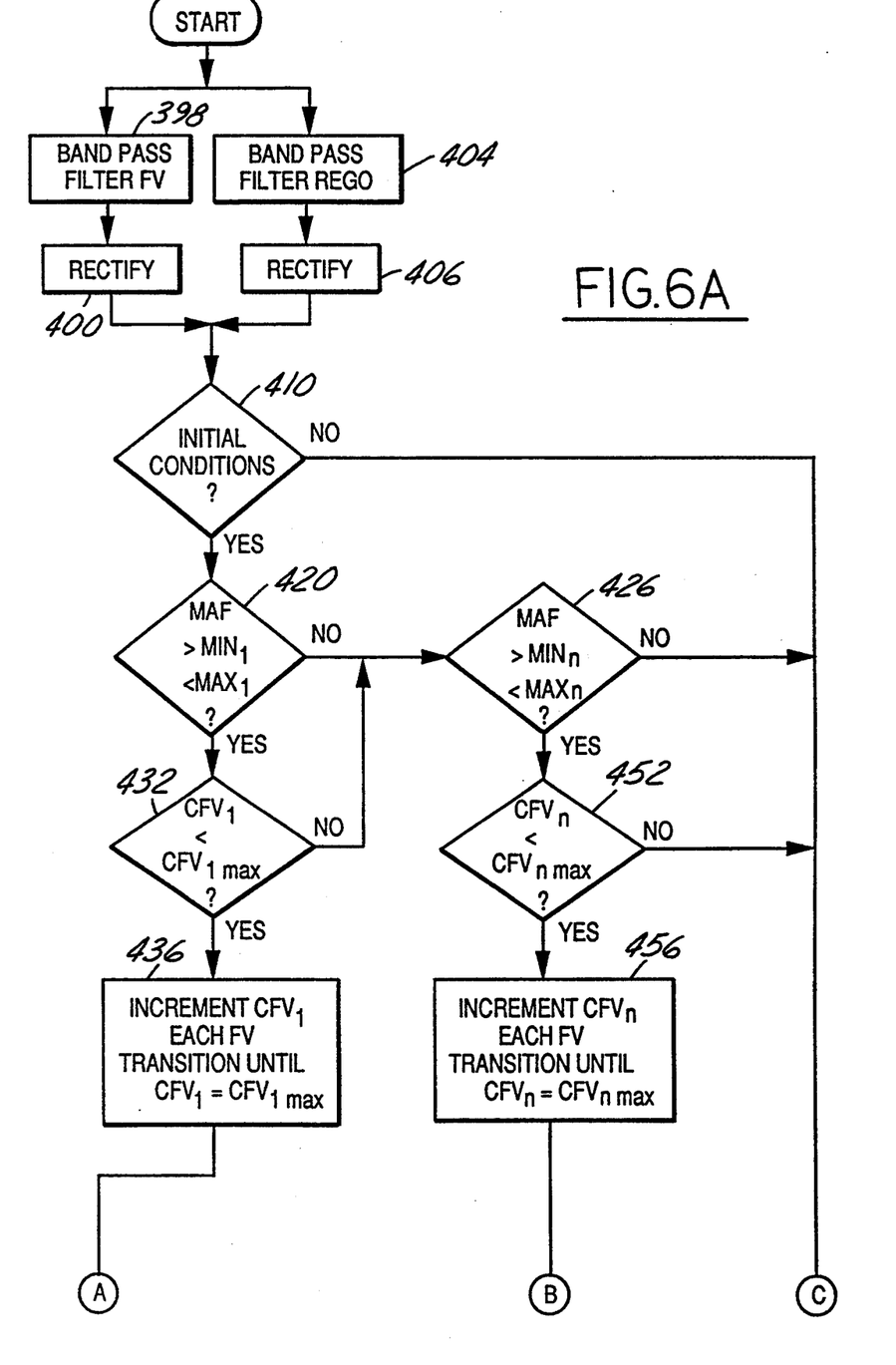
FIGS. 6A-6B are a high level flowchart of various operations performed by a portion of the embodiment shown in FIG. 1.
Figure 6B:
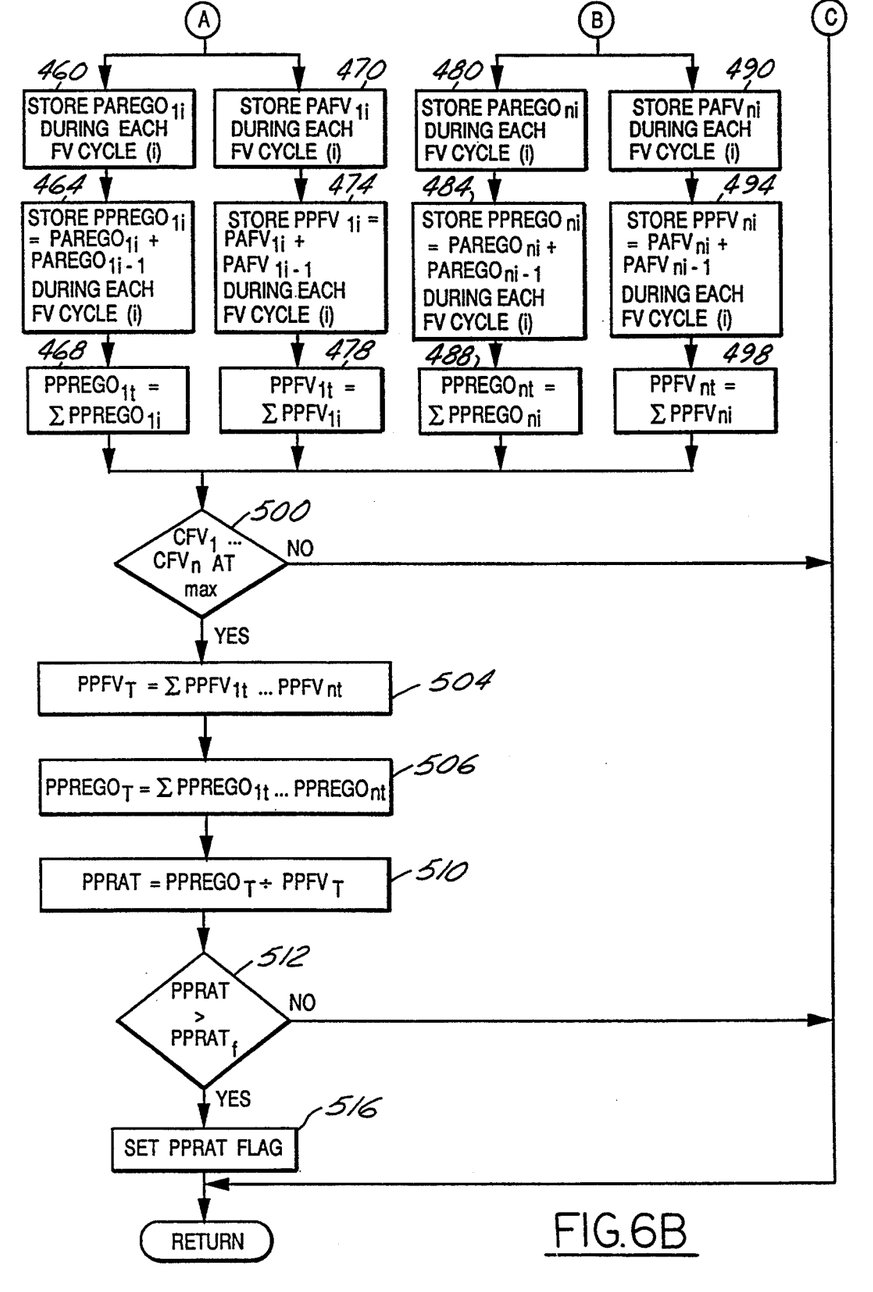
Figure 7A:
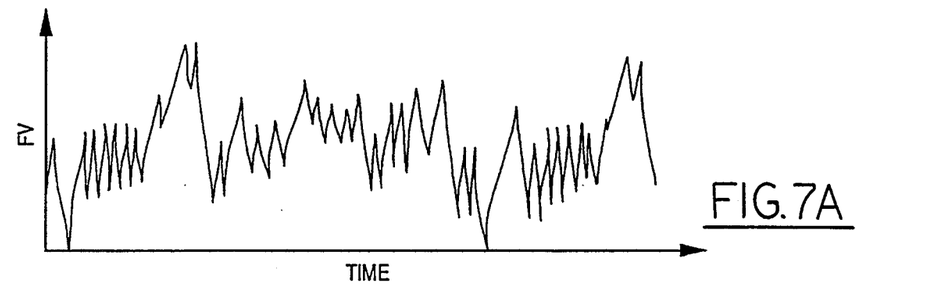
FIGS. 7A-7B are graphical representations of various electrical signals generated by the embodiment shown in FIG. 1.
Figure 7B:
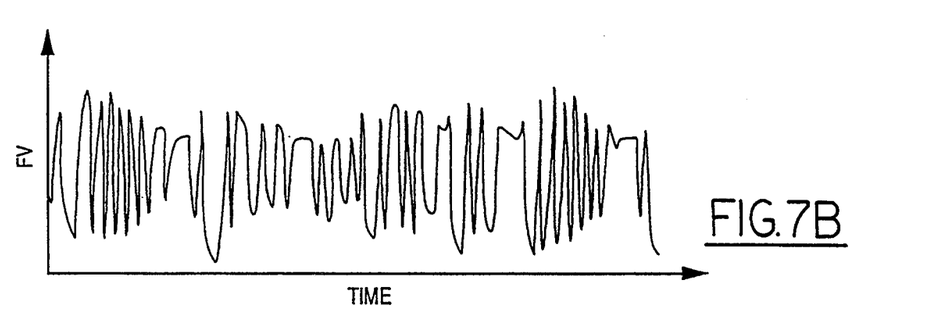
Figure 8A:
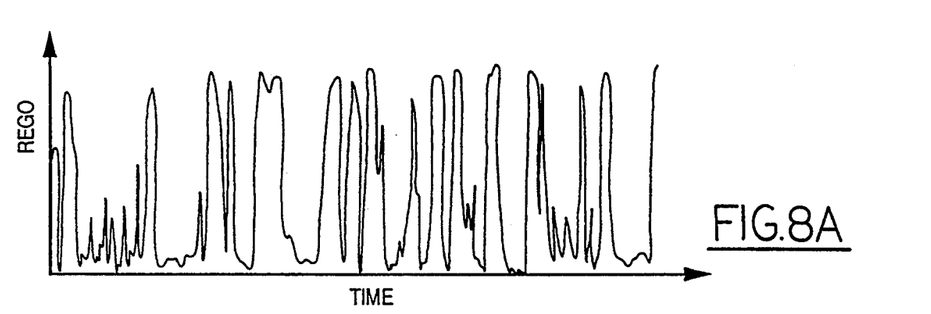
FIGS. 8A-8B are graphical representations of various electrical signals generated by the embodiment shown in FIG. 1.
Figure 8B:
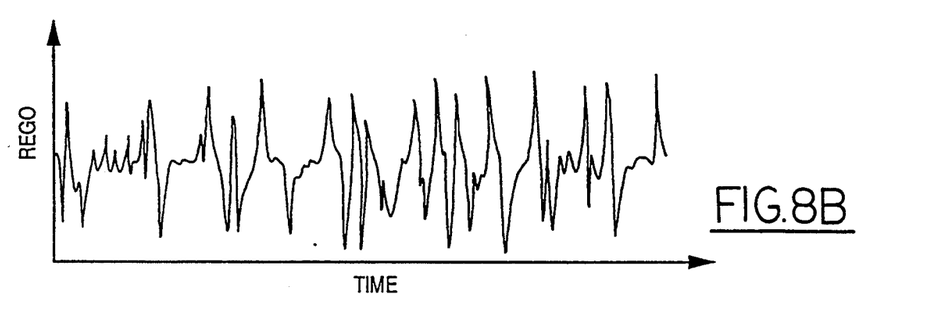

The second of three examples presented herein for providing an indication of converter efficiency is now described with particular reference to the flowchart shown in FIGS. 5A–5B. During step 298, initial engine conditions are checked (see step 210 in FIG. 4A) before entering the test cycle described below. During steps 300, 304, and 306, the induced airflow range in which engine 28 operating is determined. These ranges are described as range (1), range (2), and range (n) for this example wherein "n" induced airflow ranges are used to advantage.

Assuming engine operation is within airflow range (1), transitions between states of signal FEGO are counted to generate count signal $CF_1$. This count is compared to maximum count $CF_{1max}$ during step 312. While engine operation remains within airflow range (1), count $CF_1$ is incremented each transition of signal FEGO until count $CF_1$ is equal to maximum count $CF_{1max}$ (step 316). Similarly, count $CR_1$ is incremented each transition of signal REGO until count $CF_1 = CF_{1max}$.

The above described operation occurs for each airflow range. For example, when engine 28 is operating within airflow range (n) as shown in step 306, test period (n), count $CF_n$, and count $CR_n$ are generated as shown in steps 332, 336, and 338.

During step 350, a determination is made as to whether engine 28 has operated in all airflow ranges (i ... n) for the required minimum duration or test period. Stated another way, step 350 determines when each count of transitions in signal FEGOS ($CF_1$, $CF_2$, ... $CF_n$) have reached their respective maximum values ($CF_{1max}$, $CF_{2max}$, ... $CF_{nmax}$). Each count ($CF_{1max}$ ... $CF_{nmax}$) of transitions in signal FEGOS is then summed in step 354 to generate total count $CF_t$.

Total count $CR_t$ is generated in step 356 by summing each count ($CR_1 \ldots CR_n$) for each airflow range during the test period. A ratio of total count $CR_t$ to total count $CF_t$ is then calculated during step 360 and all counts subsequently reset in step 362. If the calculated ratio is greater than a preselected reference ratio ($RAT_f$) a frequency ratio flag is set (steps 366 and 370) indicating that converter efficiency has degraded below a preselected limit.

Referring now to FIGS. 6A–6B, an additional indication of converter efficiency is now described wherein peak-to-peak amplitude ratio of signal REGO is compared to peak-to-peak amplitude of signal FV. Steps 398–456 are processed in a manner similar to that previously described herein with respect to corresponding steps 198–256 shown in FIGS. 4A–4B.

During step 398 and step 400, signal FV is band pass filtered and then rectified. Similarly, signal REGO is band pass filtered, and the filtered output rectified (see steps 404 and 406 in FIG. 6A). Initial engine conditions are checked during step 410 before entering the test cycle described below.

The inducted airflow range in which engine 28 is operating is determined during steps 420, 424, and 426. When engine 28 is operating within airflow range (1), the transition between states of signal FV are counted to generate count signal $CFV_1$. Each transition of signal FV, count $CFV_1$ is incremented until it reaches its maximum count $CFV_{1max}$ (steps 432 and 436). The same procedure is followed when engine 28 is operating within airflow range (n) as shown in steps 426, 452, and 456. This portion of the converter test cycle or period is completed when engine 28 has operated in each of "n" airflow ranges during a preselected number of transitions in signal FV. A similar result may also be achieved by counting transitions in signal FEGO in place of transitions in signal FV.

While engine 28 is operating in airflow range (1), peak amplitude $PARGO_{1i}$ of signal REGO is stored during each cycle (i) of signal FV in step 460. During step 464, peak-to-peak signal $PPREGO_{1i}$ is calculated by adding peak amplitude $PARGO_{1i}$ during the present (i) cycle to the peak amplitude during the previous (i−1) cycle. Total peak amplitude $PPREGO_{1t}$ for airflow range (1) is calculated by adding peak-to-peak amplitude $PPREGO_{1i}$ from each FV cycle.

Continuing with the example presented for airflow range (1), peak amplitude $PAFV_{1i}$ of feedback variable FV is stored during each cycle (i) of signal FV. Peak-to-peak amplitude $PPFV_{1i}$ is calculated in step 474 by adding peak amplitude $PAFV_{1i}$ during each signal FV cycle (i) to peak amplitude $PAFV_{1i-1}$ from the previous (i−1) cycle of signal FV. Total peak-to-peak amplitude $PPFV_{1t}$ of signal FV while engine 28 is operating in airflow range (1) is calculated in step 478 by adding peak-to-peak amplitude $PPFV_{1i}$ for each cycle (i) of signal FV.

Total peak-to-peak amplitude $PPREGO_{nt}$ of signal REGO while engine 28 is operating in airflow range (n) is calculated during steps 480, 484, and 488 in a manner substantially the same as previously described herein with respect to corresponding steps 460, 464, and 468. Similarly, peak-to-peak signal $PPFV_{nt}$ is calculated during steps 490, 492, and 498 in a manner substantially the same as previously described herein with respect to corresponding steps 470, 474, and 478.

The test cycle for the example presented in FIGS. 6A–6B is completed when the count in transitions of signal FV for each airflow range ($CFV_1 \ldots CFV_n$) reaches its respective maximum value (step 500). After completion of this test period or cycle, the total peak-to-peak amplitude of signal FV ($PPFV_T$) is calculated in step 504 by summing the total peak-to-peak amplitude of signal FV for each of the airflow ranges. Similarly, the total peak-to-peak amplitude of signal REGO over this test period is calculated in step 506. During step 510, a ratio of peak-to-peak amplitudes (PPRAT) is calculated by dividing total peak-to-peak amplitude of signal FV into total peak-to-peak amplitude of signal REGO after completion of the test period. When peak-to-peak ratio PPRAT is greater than reference ratio $PPRAT_F$ (step 512), the peak-to-peak ratio flag is set in step 516.

Figure 9:
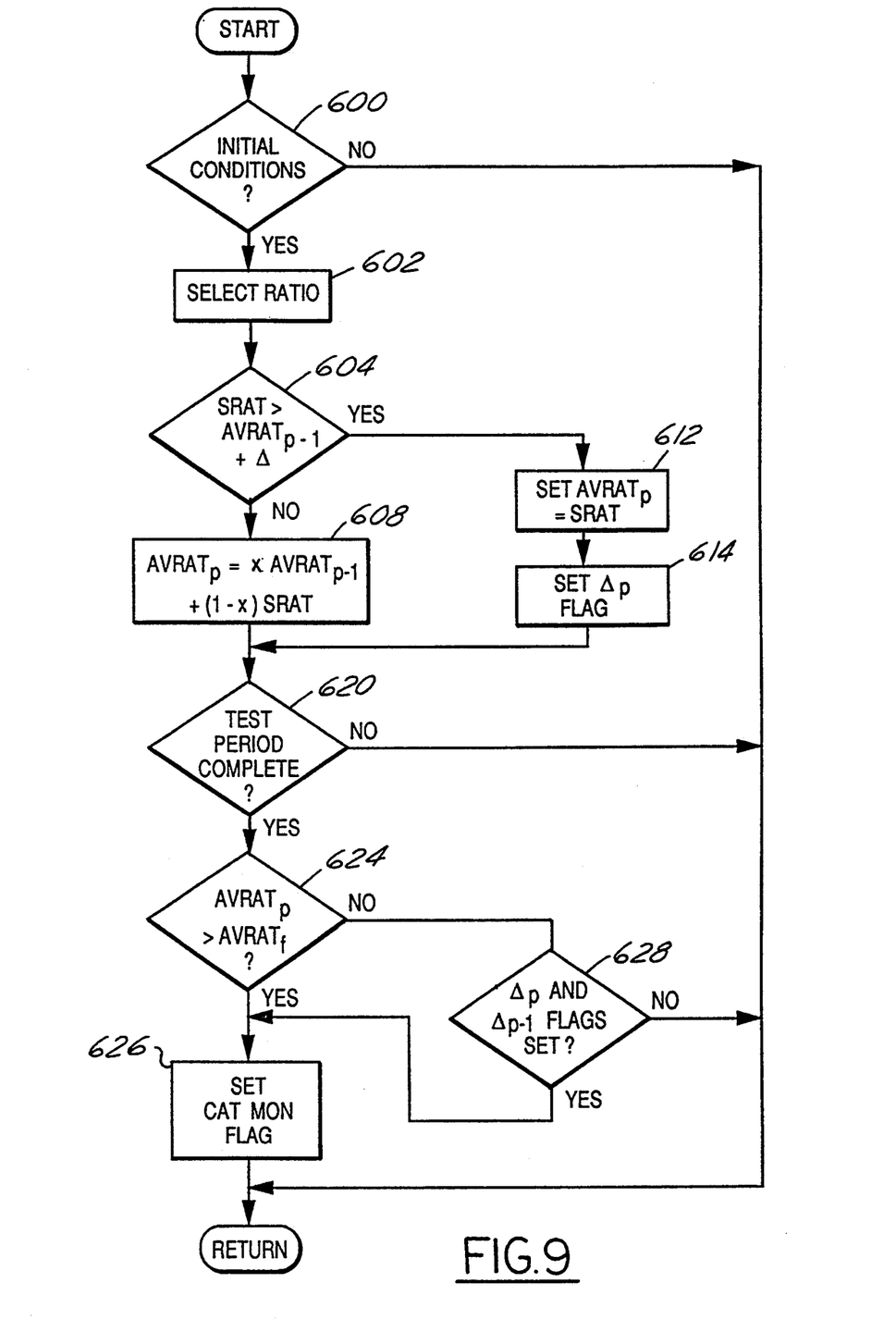
FIG. 9 is a high level flowchart of various operations performed by a portion of the embodiment shown in FIG. 1.

Referring now to the routine shown in FIG. 9, selection of the appropriate monitoring ratio and computation of its weighted average is now described. After initial conditions are verified in step 600, in a manner similar to that previously described with reference to step 210 in FIG. 4A, the appropriate monitoring ratio is selected in step 602. For the particular examples presented herein, the selected monitoring ratio may be either area ratio ARAT (from the routine shown in FIGS. 4A–4B), or frequency ratio FRATIO (from the routine shown in FIGS. 5A–5B), or peak-to-peak amplitude ratio PPRAT (from the routine shown in FIGS. 6A–6B).

A weighted average of selected ratio SRAT is computed each test cycle (p) during step 608 provided that selected ratio SRAT is within predetermined range Δ of the ratio averaged over previous test cycles (AVRAT$_{p-1}$) as determined in step 604. For this particular example, predetermined range Δ was selected as three standard deviations from the average.

Weighted average AVRAT$_p$ for the present test cycle is computed in step 608 by adding a percentage (shown in this example as x) of previous weighted average AVRAT$_{p-1}$ to the product of the complimented percentage (1−x) times selected ratio SRAT from the present test cycle (p). For the particular example presented herein percentage x is selected as eighty percent.

When selected ratio SRAT is greater than Δ deviation from previous average ratio AVRAT$_{p-1}$ (step 604), the weighted average for the present test period (AVRAT$_p$) is reset to selected ratio SRAT in step 612. Concurrently, the Δ$_p$ flag for the current test period is set in step 614. The weighted averaging is thereby prevented from inadvertently masking a sudden and significant change in converter efficiency.

The test period is completed (step 620) when the count in transitions of feedback variable FV reaches a preselected number for each airflow range (see step 274 in FIG. 4B). Weighted average AVRAT$_p$ for this test period is then compared to a preselected or predetermined value (AVRAT$_f$) in step 624. The catalytic monitor flag is set in step 626 in response to an affirmative comparison indicating degraded converter efficiency. The monitor flag (step 626) is also set when selected ratio SRAT exceeds the average ratio by Δ for both the present and previous test cycles (see step 628).

Figure 10:
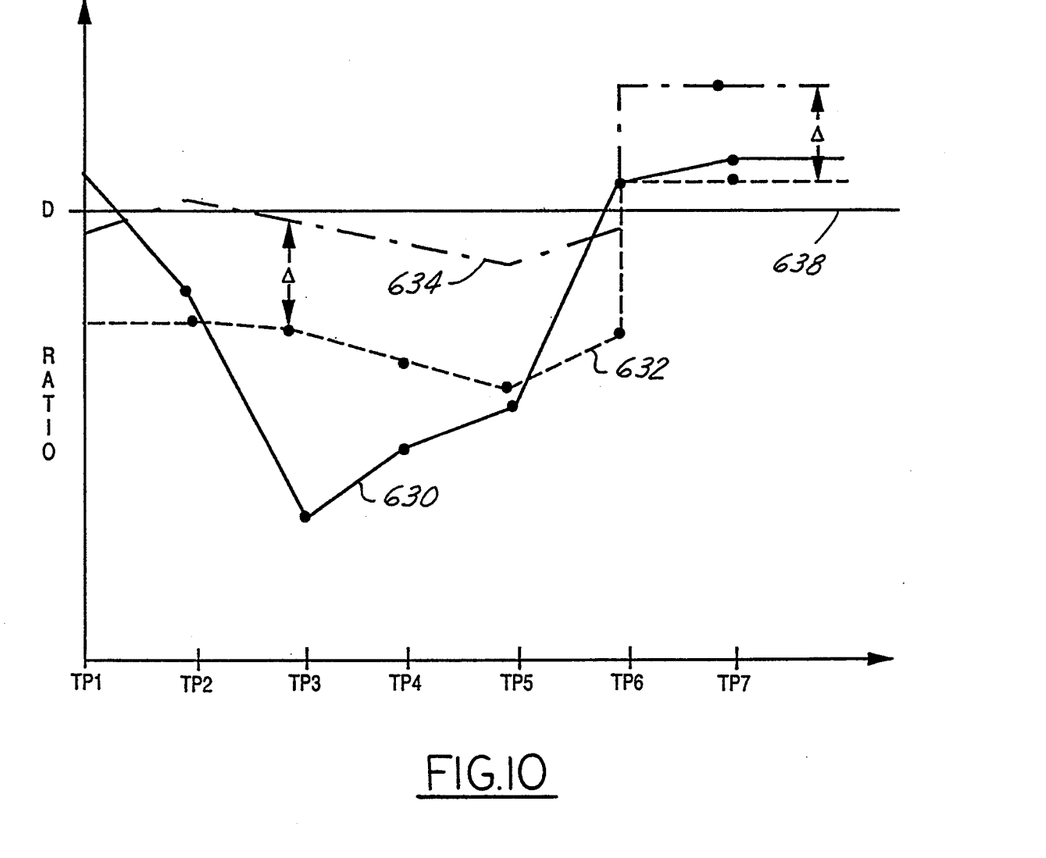
FIG. 10 is a graphical representation of an example of operation performed by a portion of the embodiment shown in FIG. 1.

The operation described above with respect to FIG. 9, may be better understood by reviewing a graphical representation of an example of operation presented in FIG. 10. For this particular example, a hypothetical selected ratio SRAT is shown on line 630, corresponding weighted average (AVRAT) is shown on line 632, deviation Δ above weighted average AVRAT is shown on line 634, and the reference ratio indicating degradation in converter efficiency is shown on line 638. Selected ratio SRAT (line 630) and weighted average ratio AVRAT (line 632) are shown updated at the end of each test period (TP1–TP7).

For the particular example presented herein, it is noted that at the end of test period one (TP1), selected ratio SRAT is above the reference ratio shown by line 638. However, this appears to be a casual fluctuation caused by conditions such as operator habit and is not indicated as a failure because weighted average ratio AVRAT is below reference line 638.

At the end of test period 6 (TP6), selected ratio SRAT (line 630) exceeds weighted average ratio AVRAT by more than Δ. Accordingly, weighted average AVRAT is reset to selected ratio SRAT as shown at TP6 in FIG. 10. For the example presented herein, the reset weighted average AVRAT exceeds reference line 638 resulting in an indication of converter degradation. Thus, it is seen that although the weighted average computation prevents erroneous indications, it will not hamper an indication of sudden degradation.

An example of operation is presented wherein both upstream sensor 44 and downstream sensor 52 are two-state exhaust gas oxygen sensors. The invention claimed herein, however, may be used to advantage with other sensors such as proportional sensors. Other modifications will become apparent to those skilled in the art without departing from the spirit and scope of the invention. Accordingly, it is intended that the scope of the invention be defined only by the following claims.

What is claimed:

1. A method for controlling engine air/fuel ratio and currently monitoring efficiency of a catalytic converter positioned in the engine exhaust, comprising the steps of:
   controlling fuel delivery to the engine in response to an output of an exhaust gas oxygen sensor positioned upstream of the catalytic converter and an output of an exhaust gas oxygen sensor positioned downstream of the catalytic converter;
   providing a test period each time the engine has completed a predetermined operation;
   generating a monitoring ratio of a downstream signal derived from said downstream sensor output to an upstream signal derived from said upstream sensor output for each of said test periods;
   providing a weighted average of said monitoring ratio over a plurality of said test periods;
   indicating degradation in efficiency of the converter when said weighted average of said monitoring ratio exceeds a predetermined value; and
   wherein said downstream signal is derived from frequency in transitions of said downstream sensor output and said upstream signal is derived from frequency in transitions of an integration of said upstream sensor output.

2. The method recited in claim 2 wherein said weighted average of said monitoring ratio is reset to said monitoring ratio after said monitoring ratio exceeds said weighted average by a preselected amount.

3. The method recited in claim 2 wherein said preselected amount comprises three standard deviations from said weighted average.

4. The method recited in claim 1 wherein said indication of converter degradation is also indicated when said monitoring ratio exceeds said weighted average of said monitoring ratio by a preselected amount for a preselected number of times.

5. The method recited in claim 1 further comprising a step of providing said test period by determining when the engine has completed operation within each of a plurality of inducted airflow ranges for at least a minimum duration in each of said airflow ranges.

6. The method recited in claim 6 wherein said minimum duration is generated by counting a preselected number of transitions in said upstream exhaust gas oxygen sensor output.

7. The method recited in claim 1 wherein said downstream signal is derived from amplitude of said downstream sensor output and said upstream signal is derived from an integration of said upstream sensor output.

8. The method recited in claim 2 wherein said downstream signal is derived from an integration of said downstream sensor output and said upstream signal is derived from an integration of a rectified integration of said upstream sensor output.

9. The method recited in claim 2 further comprising a step of band pass filtering said downstream sensor output and said upstream sensor output.

10. A method for controlling engine air/fuel ratio and concurrently monitoring efficiency of a catalytic converter positioned in the engine exhaust, comprising the steps of:

- integrating an output of an exhaust gas oxygen sensor positioned upstream of the catalytic converter to generate a feedback variable;
- controlling fuel delivery to the engine in response to at least said feedback variable;
- generating a monitoring ratio related to a ratio of frequency of transitions in said feedback variable to frequency in transitions of an output from an exhaust gas oxygen sensor positioned downstream of the catalytic converter during each of a plurality of test periods;
- providing one of said test periods each time the engine has completed a predetermined operation;
- providing a weighted average of said monitoring ratio over a plurality of said test periods; and
- indicating degradation in efficiency of the converter when at said weighted average of said monitoring ratio is beyond a preselected value.

11. The method recited in claim 10 wherein said step of providing said test periods further comprises determining when the engine has completed operation within each of a plurality of inducted airflow ranges for at least a minimum duration in each of said airflow ranges.

12. The method recited in claim 11 wherein said minimum duration comprises a preselected number of transitions in said feedback variable.

13. The method recited in claim 10 wherein said weighted average of said monitoring ratio is reset to said monitoring ratio after said monitoring ratio exceeds said weighted average by a preselected amount.

14. The method recited in claim 10 wherein said indication of converter degradation is also indicated when said monitoring ratio exceeds said weighted average of said monitoring ratio by a preselected amount for a preselected number of times.

15. A system for controlling engine air/fuel ratio and indicating efficiency of a catalytic converter positioned in the engine exhaust, comprising;

- control means for controlling fuel delivered to the engine in response to a feedback variable derived by integrating an output of an exhaust gas oxygen sensor positioned upstream of the converter;
- generating means for generating a monitoring ratio related to a ratio of frequency of transitions in said feedback variable to frequency in transitions of said downstream exhaust gas oxygen sensor output during each of a plurality of test periods;
- test means for generating each of said test periods when the engine has completed operation within each of a plurality of inducted airflow ranges for at least a predetermined duration in each of said airflow ranges;
- averaging means for averaging said monitoring ratio over a plurality of said test periods, said averaged monitoring ratio being reset to said monitoring ratio after said monitoring ratio exceeds a predetermined value; and
- indicator means for indicating degraded converter efficiency when said averaged monitoring ratio exceeds a preselected ratio.

16. The system recited in claim 15 further comprising first filter means for band pass filtering said feedback variable and second filter means for band pass filtering said downstream exhaust gas oxygen sensor output.

17. The system recited in claim 15 wherein said control means further includes trim means for trimming said feedback variable in response to an integration of said downstream sensor.

18. The system recited in claim 15 wherein said test means determines operation within a particular airflow range by comparing inducted airflow to a preselected minimum value and a preselected maximum value so that converter efficiency is determined over a range of exhaust gas flows.

* * * * *